(12) United States Patent
Ikedo et al.

(10) Patent No.: US 6,195,503 B1
(45) Date of Patent: Feb. 27, 2001

(54) IMAGE AND SOUND RECORDING/REPRODUCING APPARATUS

(75) Inventors: Hiroyasu Ikedo; Hiroyasu Otsubo; Naoki Yamamoto, all of Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/019,808

(22) Filed: Feb. 6, 1998

(30) Foreign Application Priority Data

Feb. 17, 1997 (JP) .................................................. 9-031660

(51) Int. Cl.$^7$ .................................................. H04N 5/928
(52) U.S. Cl. .................................... 386/104; 386/105
(58) Field of Search ................................ 386/46, 96, 98, 386/105, 111, 112, 107, 117; 358/906, 909.1; 369/275.4; H04N 5/928

(56) References Cited

U.S. PATENT DOCUMENTS

| | | | |
|---|---|---|---|
| 4,858,031 | * 8/1989 | Fukuda | 386/105 |
| 5,057,932 | * 10/1991 | Lang | 386/105 |
| 5,231,511 | * 7/1993 | Kodama et al. | 358/909.1 |
| 5,596,565 | * 1/1997 | Yonemitsu et al. | 369/275.4 |
| 5,774,623 | * 6/1998 | Maeda et al. | 386/98 |

* cited by examiner

Primary Examiner—Huy Nguyen
(74) Attorney, Agent, or Firm—Antonelli, Terry, Stout & Kraus, LLP

(57) ABSTRACT

An image and sound recording/reproducing apparatus easy for use with a personal computer or the like, to record/reproduce image and sound compressed data, with ease and convenience in reproduction, editing operations and the like being taken into consideration. A still picture and a sound are inputted into an image input terminal and a sound input terminal, respectively. The still picture inputted is compressed in accordance with the JPEG system by a JPEG codec, and is recorded in a recording device through a multiplex separation unit as still picture compressed data. Also, sound inputted is compressed in accordance with the MPEG audio system by a MPEG codec, and is recorded in the recording device through the multiplex separation unit as sound compressed data. A controller controls the compression process and recording through a control signal through a mode selection signal input terminal or a shutter trigger input terminal.

26 Claims, 6 Drawing Sheets

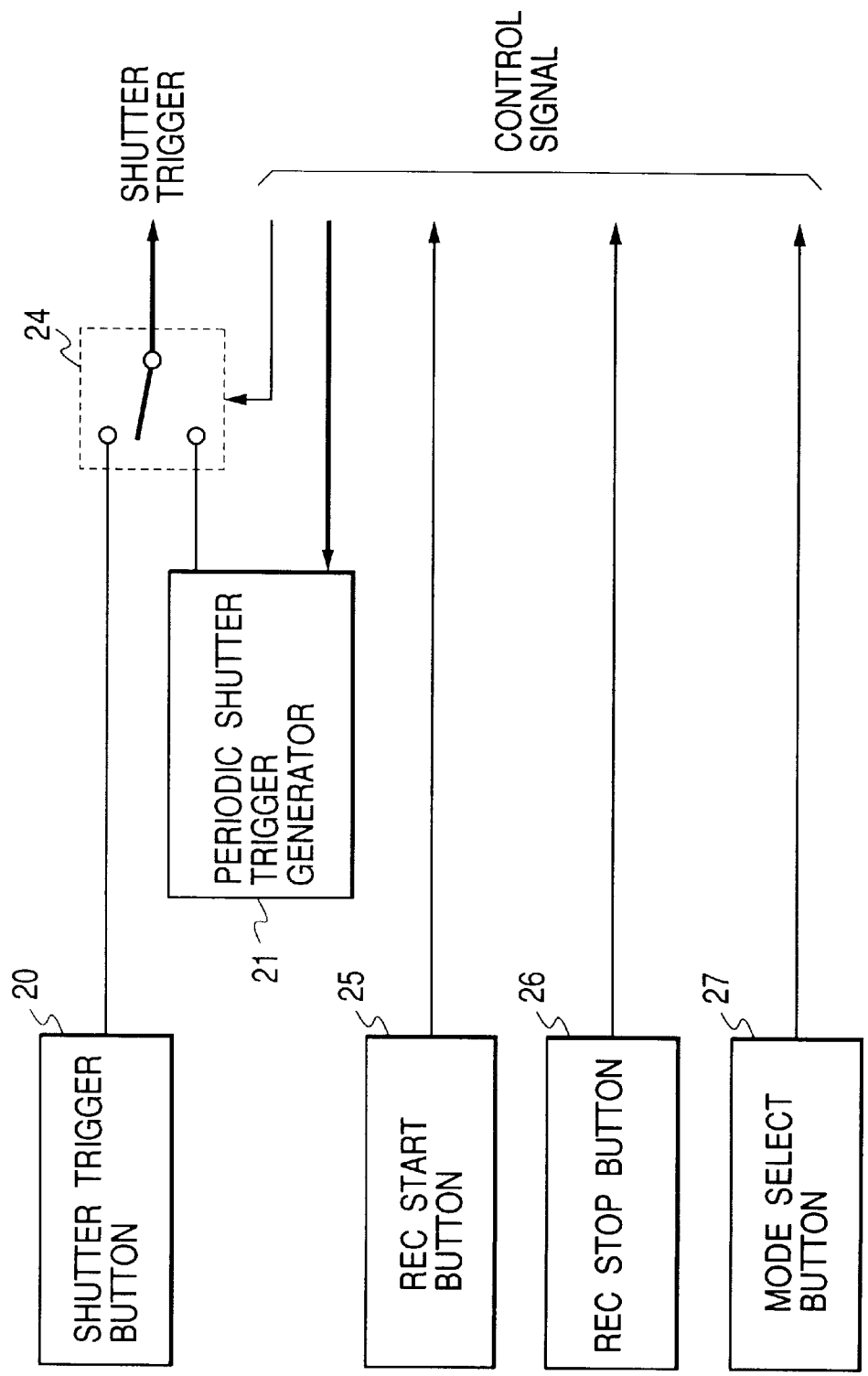

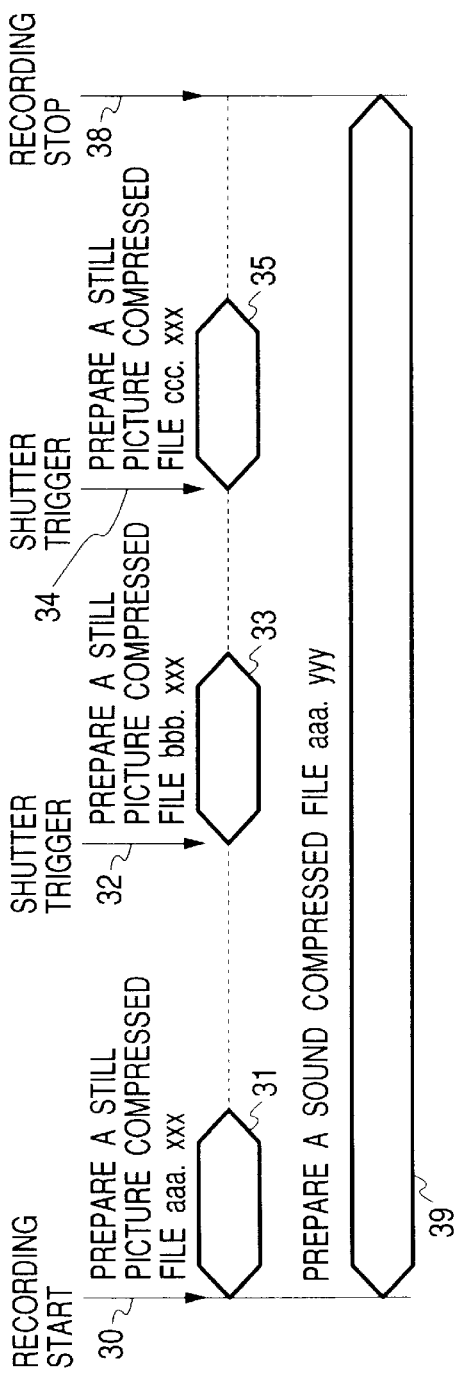
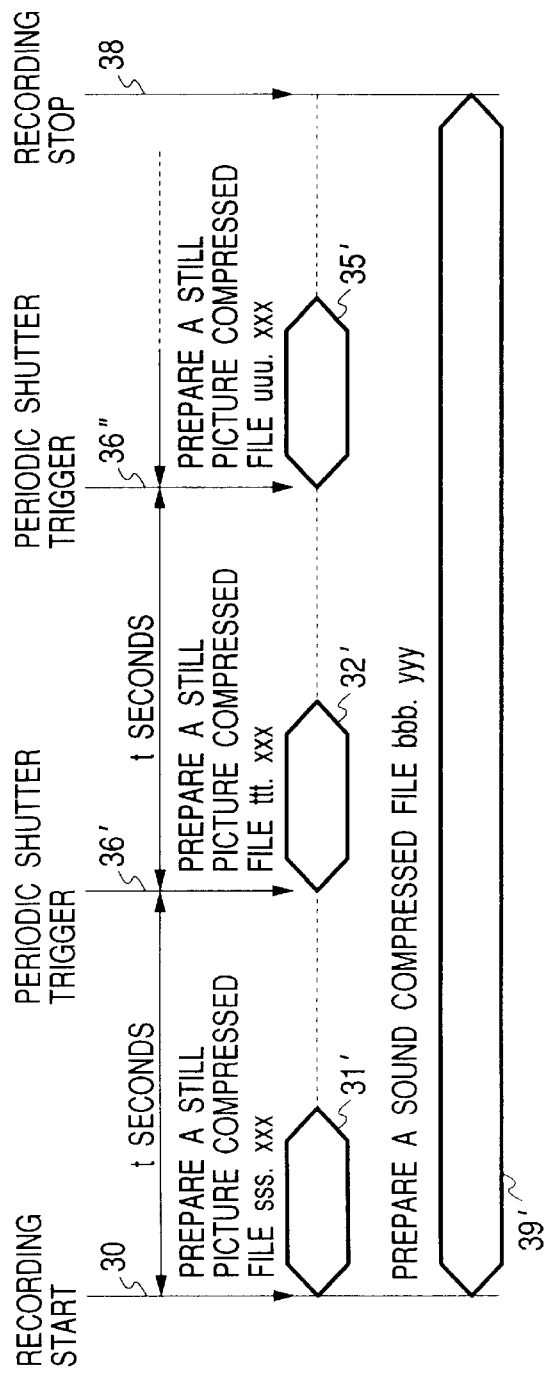

IMAGE AND SOUND RECORDING/REPRODUCING APPARATUS

BACKGROUND OF THE INVENTION

1. Field of the Invention

The present invention relates to an image and sound recording/reproducing apparatus provided with functions for efficiently and accurately compressing and decompressing animations and still pictures, together with sounds (e.g., a subject's voice).

2. Description of Related Art

There are currently various methods for compressing and decompressing data. As one example, international standards have already been established for coding methods for still pictures and animations. As one coding system for still pictures, there is a Joint Photographic Coding Experts Group (JPEG) system (e.g., see newest MPEG textbook, ASCII, pp. 53 to 56), and as one coding system for animation, there is a Moving Picture Experts Group (MPEG) system. In the MPEG system, there are MPEG1 (e.g., see newest MPEG textbook, ASCII, pp. 89 to 93) for storage media such as CD-ROM, and DAT, and MPEG2 (newest MPEG textbook, ASCII, pp. 129 to 131).

According to the aforesaid examples, in a case of compressing a still picture and a sound, when the still picture is compressed by the JPEG system, unlike the MPEG system, there are no particular regulations concerning a set compression process for any accompanying sound (i.e., previously, still pictures typically did not have sound data associated therewith), and therefore, sound may be individually processed with freedom of choice of a sound processing method to be applied. One approach applying a JPEG image compression/decompression process and an ADPCM sound compression/decompression process can be seen in the reference of "Development of Digital Camera DC-1", *ITE Technical Report* Vol. 19, No. 45, pp. 15–20 (September 1995). Such approach is disadvantageous in that the ADPCM compression/decompression process is not widely distributed/available, thus making use inconvenient for users.

SUMMARY OF THE INVENTION

The present invention is directed toward allowing compressed data for a still picture and especially for sound (subjected to a separate process) to be compressed/decompressed by use of widely available/popular equipment such as a personal computer. More particularly, if image data is to be compressed/decompressed using the JPEG (for still images) or MPEG (for animations) systems, the present disclosure details that it has found advantageous to have sound data compressed/decompressed using the MPEG system.

More specifically, with the spread of the Internet or the like, software corresponding to the JPEG system and MPEG system (e.g., as means for compressing/decompressing image data) is typically installed within personal computers before delivery thereof, and/or is widely available for free/low-cost downloading from the Internet, i.e., the JPEG and MPEG systems for image compression/decompression are widely available and accepted in everyday use in personal computers or the like. For this reason, as a means for compressing/decompressing sound data, software corresponding to the MPEG system should be generally used as such software is widely/cheaply available and personal computer users typically are well-versed in its usage.

Therefore, in the case of adding sound to compressed data for a still picture, if the sound data is compressed by the MPEG system in advance, such MPEG compressed sound data is able to be easily decompressed by a personal computer or the like without the need for any extra operation such as reconversion. The present invention has been achieved aiming at this point, and its object is to provide an image and sound recording/reproducing apparatus easy for the user of a personal computer or the like to take in image or sound compressed data, with ease and convenience of reproduction, editing operations and the like, being taken into consideration.

In order to solve the aforesaid problem, when compressing a sound with a still picture, an image and sound recording/reproducing apparatus comprises: compression means for compressing a still picture and a sound; multiplexing means for multiplexing compressed data for the still picture and the sound compressed by the compression means; recording means for recording the output from the multiplexing means; separation means for taking out the compressed data from the recording means to separate them into compressed data for the image and the sound respectively; decompression means for decompressing the compressed data for the image and the sound to be outputted from the separation means; and control means for controlling the compression means, the multiplexing means, the recording means, the separation means and the decompression means. When recording and reproducing a sound with a still picture, the still picture is compressed/decompressed by the JPEG system, and the sound is compressed/decompressed by the MPEG system to achieve the aforesaid object.

The foregoing and other objects, advantages, manner of operation, novel features and a better understanding of the present invention will become apparent from the following detailed description of the preferred embodiments and claims when read in connection with the accompanying drawings, all forming a part of the disclosure hereof this invention. While the foregoing and following written and illustrated disclosure focuses on disclosing embodiments of the invention which are considered preferred embodiments, it should be clearly understood that the same is by way of illustration and example only and is not to be taken by way of limitation, the spirit and scope of the present invention being limited only by the terms of the appended claims.

BRIEF DESCRIPTION OF THE DRAWINGS

The following represents brief descriptions of the drawings, wherein:

FIG. 2 is a block diagram showing operational buttons and a periodic shutter trigger generator in relation to a shutter trigger signal and a control signal;

FIGS. 3a–3b are timing diagrams explaining differing operations in preparing a compressed file for a sound with a still picture in the embodiment according to the present invention;

DETAILED DESCRIPTION OF THE PREFERRED EMBODIMENTS OF THE INVENTION

Figure 1:
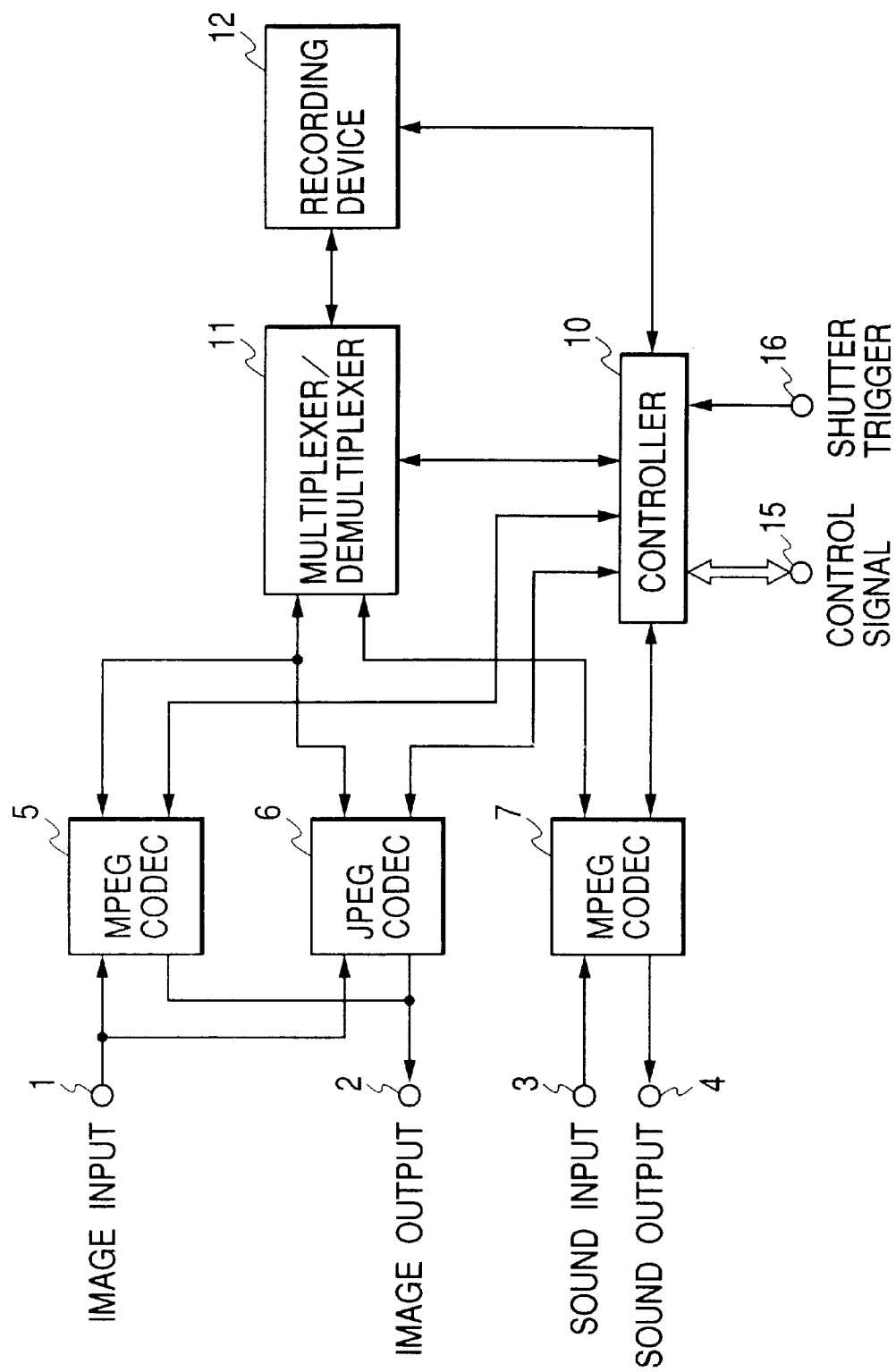
FIG. 1 is a block diagram showing an embodiment according to the present invention.

Before beginning a detailed description of the subject invention, mention of the following is in order: More particularly, when appropriate, like reference numerals and characters are used to designate identical, corresponding or similar components in differing figure drawings.

FIG. 1 is a block diagram showing an embodiment of an image and sound recording/reproducing apparatus according to the present invention. In FIG. 1, a still picture and a sound (e.g, a subject's voice) data are inputted into an image input terminal 1 and a sound input terminal 3, respectively (e.g., via an image pickup and microphone), during recording. The still picture data inputted is compressed in accordance with the JPEG system by a JPEG codec (coder-decoder) 6, and is recorded in a recording device 12 after being routed through a multiplex separation (i.e., multiplexer/demultiplexer) unit 11 as still picture compressed data. Also, the sound data inputted is compressed in accordance with the MPEG audio system by a MPEG codec 7, and is recorded in the recording device 12 after being routed through the multiplex separation unit 11 as sound compressed data. A controller 10 controls the compression process and recording (i.e., storage) using a control signal (for example, designating a still picture mode, continuous still picture mode, mode of sound with a still picture and the like) through a mode selection signal input terminal 15 and/or a shutter trigger input terminal 16. The controller 10 can be implemented via hardware circuitry, or preferably is implemented via a microprocessor being appropriate programmed to perform the flow of operations described with respect to the FIG. drawings.

Next, during a reproduction process, the compressed data for still picture and sound are copied into the multiplex separation unit 11 from the recording device 12, respectively. In the multiplex separation unit 11, the data are separated into the still picture compressed data and the sound compressed data. The still picture compressed data thus separated are supplied to and decompressed in the JPEG codec 6, and become a reproduced still picture data which is then outputted through an image output terminal 2 (e.g., to be subsequently delivered to a display device). Also, the sound compressed data thus separated are supplied to and decompressed in the MPEG codec 7, and become reproduced sound (e.g., a subject's voice) data which is then outputted through a sound output terminal 4 (e.g., to be subsequently delivered to a speaker). The controller 10 controls the decompression process and reproduction using a control signal input through a control (e.g., mode) selection signal input terminal 15 and/or a shutter trigger input terminal 16.

The image input terminal and the image output terminal are also connected to a MPEG codec 5. Accordingly, if video/animation is input via the image input terminal 1, video/animation is compressed in accordance with a MPEG system by the MPEG codec 5, and is routed through the multiplex separation unit 11 to be recorded in the recording device 12 as compressed video/animation data. In a reproducing process, the compressed video/animation data are copied from the recording device 12 into the multiplex separation unit 11, to be subsequently supplied to the MPEG codec 5. The video animation compressed data is decompressed in accordance with a MPEG system by the MPEG codec 5, and become a reproduced video/animation data which is then outputted through an image output terminal 2 (e.g., to be subsequently delivered to a display device). Thus, the image and sound recording/reproducing apparatus in FIG. 1 is capable of recording and reproducing animations, still pictures, continuous still pictures, sound with still pictures and the like, through a mode selection signal. Also, even if design is made such that a personal computer or the like is connected in place of the recording device 12, a similar operation/effect can be obtained.

Next, the detailed description will be made of recording and reproduction of a sound with a still picture with reference to FIGS. 2, 3a–3b and 4a–4b. More particularly, FIG. 2 is a block diagram showing operational buttons (i.e., controls) and a periodic shutter trigger generator in relation to a shutter trigger signal and a control signal. Shown are a shutter trigger button 20, a periodic shutter trigger generator 21, a selector switch 24 (being controlled by an appropriate control input), a record start button 25, a record stop button 26, a mode select button 27, a shutter trigger output and a control signal output. The mode select button 27 can be used (e.g., in conjunction with a LEDs or LCD display) to select between a variety of differing operational modes, e.g., recording and reproducing animations, still pictures, continuous still pictures, sound with still pictures and the like, whereupon, in response thereto, an appropriate mode designating signal is output as part of the control signal. Description will now be made of exemplary operations using such arrangements.

More specifically, FIG. 3a corresponds to a first mode concerning preparation of still pictures (with accompanying sound) at arbitrary timings through arbitrary manual selecting (i.e., pushing) of the record start button 25 and shutter trigger button 20, and FIG. 3b corresponds to a second mode concerning preparation of still pictures (with accompanying sound) at regular (i.e., periodic) intervals of t seconds through periodic selecting signals from the periodic shutter trigger generator 21. More particularly, the following discussion concentrates mainly on discussion of still picture modes having accompanying sound. Switching to or selecting either of such modes is performed by appropriate selecting using the mode select button 27 to cause an appropriate mode select signal to be input as a control signal to the control (e.g., mode) selection signal input terminal 15 of the controller 10.

Explaining now in greater detail, to select the FIG. 3a still pictures (with accompanying sound) at arbitrary timings mode, the selector switch 24 is set (via appropriate control) to pass signals from the shutter trigger button 20 as a shutter trigger signal. Thereafter, upon inputting of a recording start selection 30 (e.g., via manual pushing of the record start button 25), a first still picture is captured/inputted at 31 and a compressed file aaa.xxx is prepared through JPEG processing, whereupon the camera is then held in an image capture-ready mode. Simultaneously, sound (e.g., a subject's voice) is begun to be captured/inputted at 39. Next, when a shutter trigger 32 is inputted through manual pushing of the shutter trigger button 20, a second still picture is captured/ inputted at 33 and a compressed file bbb.xxx is prepared through JPEG processing. Further, when another shutter trigger 34 is inputted through manual pushing of the shutter trigger button 20, another still picture is captured/inputted at 35 and a compressed file ccc.xxx is prepared through JPEG processing. Upon inputting of a recording stop selection 38 (e.g., via manual pushing of the record stop button 26), still picture and sound capture/inputting is stopped, and a compressed sound file aaa.yyy is prepared by subjecting the sound to MPEG processing.

The still picture JPEG compressed files aaa.xxx, bbb.xxx, and ccc.xxx and the sound MPEG compressed file aaa.yyy are ready to be stored in the recording device 12. Beforehand, however, correlation of the still picture compressed files with the sound compressed file (for example, allowing audible reproduction of the sound compressed file aaa.yyy simultaneously with visual reproduction of the still picture compressed files aaa.xxx, bbb.xxx, ccc.xxx, . . . ) is prepared in a form of a control file having information designating, for example, an order of reproduction, time control and the like, and such is recorded in the recording device 12 together with the still picture compressed files and the sound compressed file. In this example, the still picture recording area and the sound recording area are separated, but there is no need for particularly separating the area if the two are distinguished instead during decompression processing performed in the present embodiment.

FIG. 3b is different from FIG. 3a only in that still picture compressed file sss.xxx is captured at 31' using the recording start selection 30, and still picture compressed files ttt.xxx and uuu.xxx are captured at 33', 35' using periodic control signals 36', 36" outputted from the periodic shutter trigger generator 21 (which may be implemented -either via a separately provided generator, or preferably via suitable programming and output of the controller 10) and passed through the selector switch 24 via appropriate selection. Other processes of FIG. 3b are the same as other FIG. 3a processes, and accordingly, redundant description of such processes is omitted for sake of brevity.

Figure 4B:
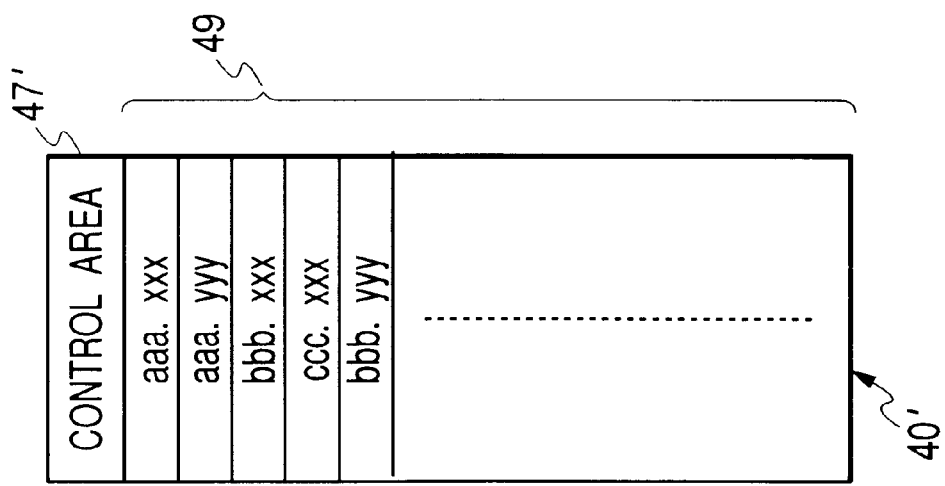
FIGS. 4a–4b are explanatory views with respect to differing possible formats for still picture compressed files and a sound compressed file in the embodiment according to the present invention.
Figure 4A:
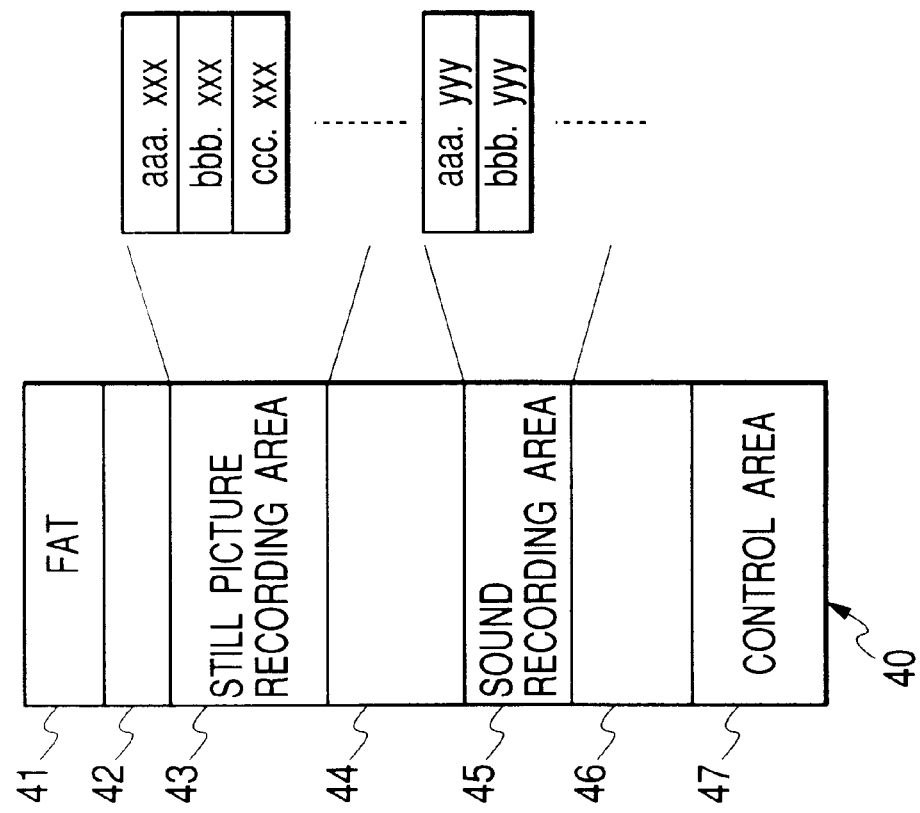

FIGS. 4a–4b show exemplary storage formats for storage of the aforementioned files in any type of storage medium 12, e.g., files of a flash card memory of a camera can be transferred to a hard disk of a personal computer, and vice versa. More specifically, FIG. 4a shows an MS-DOS like FAT (file allocation table) system stored together with the still picture compressed files aaa.xxx, bbb.xxx, ccc.xxx, sound compressed files aaa.yyy, bbb.yyy, and a control area or file. FIG. 4b shows an example of a differing file system.

In discussing FIG. 4a in greater detail, numeral 40 designates an entire recording area for a recording medium (not shown); 41 designates a FAT which is a table for controlling where within the recording medium a file is written; 42, 44 and 46 designate unreserved areas which can be freely used; 43 designates a still picture recording area in which the aforesaid still picture compressed files (aaa.xxx, bbb.xxx, ccc.xxx, . . . ) are recorded; 45 designates a sound recording area, in which the aforesaid sound compressed files (aaa.yyy, bbb.yyy, . . . ) are recorded; and, 47 designates a control area for storing information in which ones of the aforesaid still picture compressed files are associated with correlated sound compressed files, and in which a control file designating an order of reproduction, time control and the like is recorded. Within the illustrated FIGS. 4a–4b examples, the illustrated area ratio of the various file storage areas within recording area does not indicate actual recording area sizes, but instead, sizes of such areas can be freely assigned. During reproduction, a compressed file (for example, aaa.xxx, bbb.xxx, ccc.xxx, . . . and aaa.yyy) are selected from the still picture recording area 43 and the sound recording area 45 on the basis of information of the control file within the control area. The retrieved still picture compressed data and sound compressed data are decompressed by the JPEG codec 6 and the MPEG codec 7, respectively, in accordance with a predetermined timing (e.g., a timing mimicking that of the shutter trigger 20 when the sound was originally recorded), and then are outputted through the image output terminal 2 and the sound output terminal 4 to thereby reproduce sound together with any still picture.

In further describing FIG. 4b, FIG. 4b shows a case where written files are not classified particularly. More particularly, 40' designates a entire recording area of a recording medium, 47' designates a control area containing information which correlates the compressed files written in the recording area 49, controls reproducing timing during decompression of the still picture compressed data and the sound compressed data. In this case, the reproduction is performed in accordance with the content of the control area in the same manner as in FIG. 4a, and therefore, redundant description thereof is omitted for sake of brevity.

Figure 5:
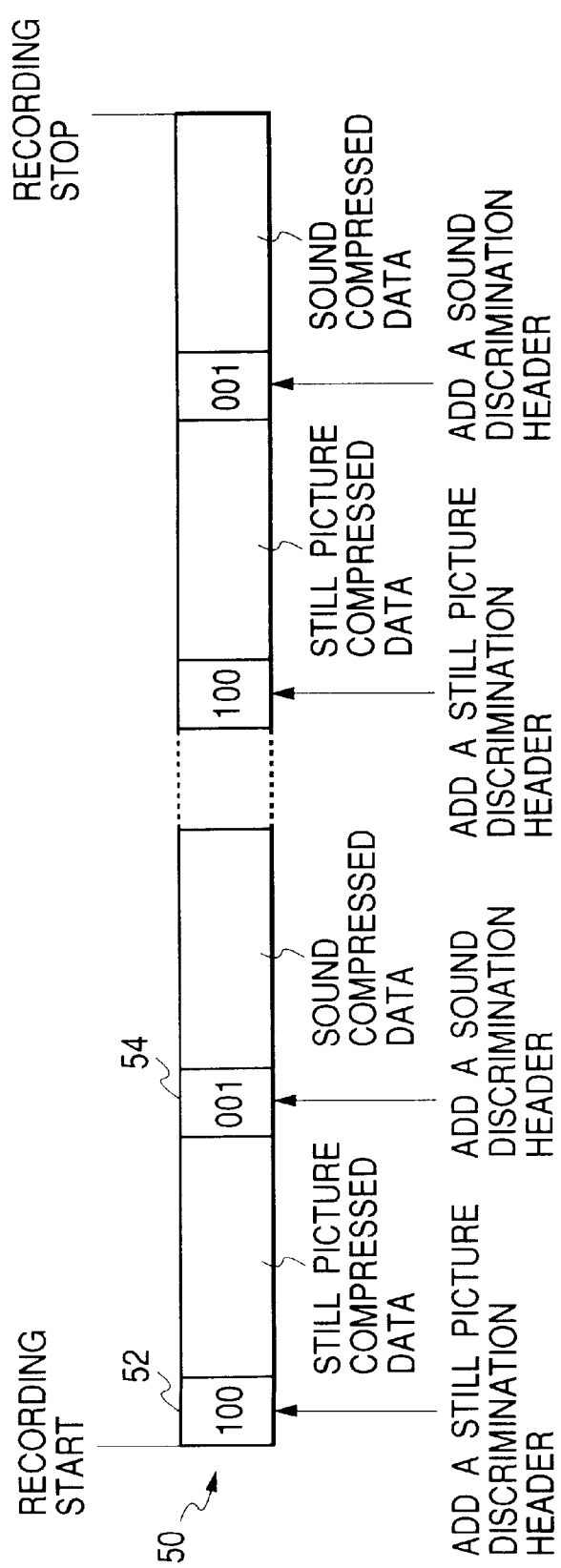
FIG. 5 is an explanatory view showing an exemplary arrangement of multiplexed still picture compressed data and sound compressed data in the embodiment according to the present invention.

As described above, an image and sound recording/reproducing apparatus according to the present invention is capable of recording/reproducing one or a plurality of still pictures with accompanying sound, both at periodic and arbitrary timing. FIG. 5 shows a case where still picture compressed data and sound compressed data 50 are multiplexed. More particularly, during the compression process, when the output from the JPEG codec 6 and the MPEG codec 7 are multiplexed at the multiplex separation unit 11, a still picture discrimination header 52 is added to a head of any still picture compressed data, and a sound discrimination header 54 is added to a head of any sound compressed data to be recorded in the recording device 12. With regard to suitable discrimination headers, any predetermined header nomenclature can be adopted, for example, the following headers can be adopted:

000=still picture
001=sound
010=animation
011=still series
100=still with sound (e.g., voice)
and information about reproducing timing, etc.

During the decompression process, desired files having still pictures and sound multiplexed therein is read from the recording device 12, the separation process is performed within the multiplex separation unit 11 by means of the still picture discrimination header 52 and the sound discrimination header 54, with the still picture compressed data then being delivered to and decompressed by the JPEG codec 6, and the sound compressed data being delivered to and decompressed by the MPEG codec 7 to thereby generate the reproduced sound with the still picture. As described above, it is possible to provide an image and sound recording/reproducing apparatus capable of recording and reproducing even when the still picture compressed data and the sound compressed data are sequentially multiplexed.

Figure 6:
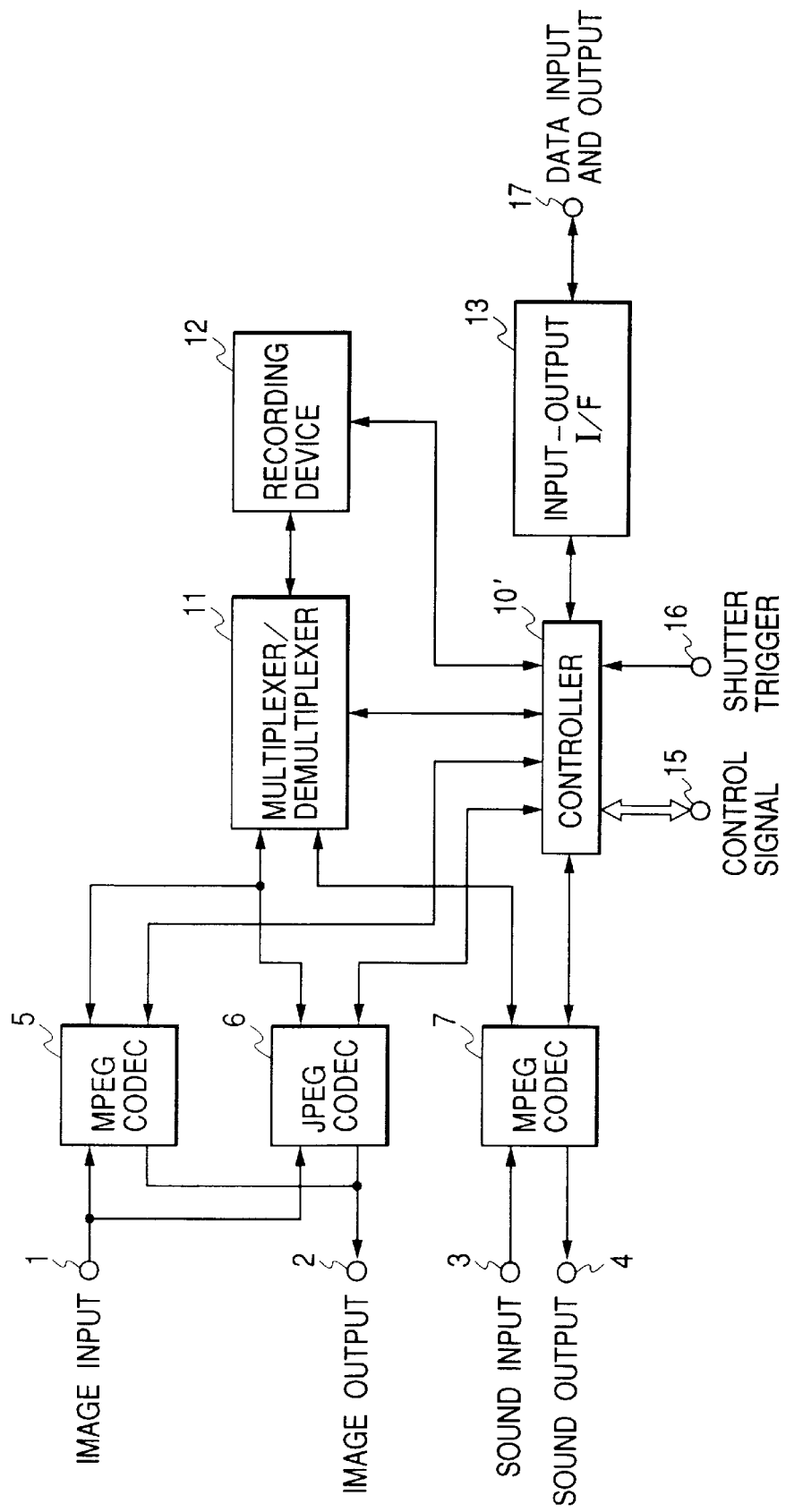
FIG. 6 is a block diagram showing another embodiment according to the present invention.

In addition to the above, it is also conceivable to construct a FIG. 6 arrangement wherein a controller 10' is provided with a function to perform/control communication with external equipment. More particularly, within FIG. 6, the controller 10' is further connected to an input/output interface circuit 13, so as to be able to perform input/output with respect to a data input/output terminal 17. As non-exhaustive examples, the input/output interface circuit 13 can be an infrared transmitter/receiver, a radio transmitter/receiver, etc.

Further, if compressed data for a sound with a still picture are prepared in advance as described in the present embodiment, it is also possible to easily perform the decompression process with a personal computer or the like, without necessitating any extra operation such as re-conversion.

According to the form of the present embodiment described above, when a sound with a still picture is compressed and decompressed, the still picture is compressed and decompressed by the JPEG system, and the sound is compressed and decompressed by the MPEG system. Therefore, it is possible to provide an image and sound recording/reproducing apparatus easy for the user of a personal computer or the like to take in image or sound compressed data, with convenience in reproduction, editing operation and the like taken into consideration.

This concludes the description of the preferred embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. As one example, while the image MPEG codec 5 and sound MPEG codec 7 are illustrated as being separately provided, such image MPEG codec and sound MPEG codec can instead be implemented via a single MPEG codec, i.e., to perform sequential (time-separated) processing of the image data and sound data, respectively, as opposed to parallel processing. In addition to variations and modifications in the component parts and/or arrangements, alternative uses will also be apparent to those skilled in the art.

What is claimed is:

1. An image and sound recording/reproducing apparatus for recording and reproducing a still picture sound with a still picture, comprising:

a Joint Photograph Experts Group (JPEG) compression/decompression means for compressing and decompressing a still picture image to produce compressed image data and decompressed image data, respectively;

a Moving Picture Experts Group (MPEG) compression/decompression means for compressing and decompressing a still picture sound related to said still picture image to produce compressed sound data and decompressed sound data, respectively wherein said still picture sound is compressed/decompressed only according to an MPEG standard;

multiplexing means for multiplexing said compressed image data and said compressed sound data;

recording means for recording output from said multiplexing means;

demultiplexing means for taking out and separating said compressed image data and said compressed sound data from said recording means, respectively; and control means for controlling said JPEG compression/decompression means, said MPEG compression/decompression means, said multiplexing means, said recording means, and said demultiplexing means, wherein a JPEG file of said still picture image, an MPEG file of said still picture sound, and control information pertaining to said JPEG file and said MPEG file, are recorded, and when said still picture sound is reproduced, a reproducing timing of said still picture sound and said still picture image is controlled by using said control information.

2. An image and sound recording/reproducing apparatus according to claim 1, further comprising a generator generating a shutter trigger for recording still pictures at arbitrary timings.

3. An image and sound recording/reproducing apparatus according to claim 1, further comprising a generator generating a control signal for recording a still picture at regular time intervals.

4. An image and sound recording/reproducing apparatus according to claim 1, further comprising a selector selecting recording and reproducing a mode selected from a group including at least a plurality of recording/reproduction according to: an animation mode, a still picture mode, a still picture series mode or a still picture with a sound mode.

5. An image and sound recording/reproducing apparatus according to claim 4, wherein when said selector selects said video/animation mode, video/animation being compressed and decompressed by MPEG compressor and decompressor.

6. An image and sound recording/reproducing apparatus according to claim 1, further comprising an interface capable of communication with external equipment, wherein said interface is any one of an infrared transmitter/receiver, a cable, a radio transmitter/receiver.

7. An image and sound recording/reproducing apparatus for recording and reproducing a still picture sound with a still picture, comprising:

a Joint Photograph Experts Group (JPEG) compression/decompression circuit compressing and decompressing a still picture image to produce compressed image data and decompressed image data, respectively;

a Moving Picture Experts Group (MPEG) compression/decompression circuit compressing and decompressing a still picture sound related to said still picture image to produce compressed sound data and decompressed sound data, respectively, wherein said still picture sound is compressed/decompressed only according to an MPEG standard;

a multiplexer multiplexing said compressed image data and said compressed sound data;

a recorder recording output from said multiplexer;

a demultiplexer taking out and separating said compressed image data and said compressed sound data from said recorder, respectively; and a controller controlling said JPEG compression/decompression circuit, said MPEG compression/decompression circuit, said multiplexer, said recorder. and said demultiplexer, wherein a JPEG file of said still picture image, an MPEG file of said still picture sound, and control information pertaining to said JPEG file and said MPEG file, are recorded, and when said still picture sound is reproduced, a reproducing timing of said still picture sound and said still picture image is controlled by using said control information.

8. An image and sound recording/reproducing apparatus according to claim 7, further comprising a generator generating a shutter trigger for recording still pictures at arbitrary timings.

9. An image and sound recording/reproducing apparatus according to claim 7, further comprising a generator generating a control signal for recording a still picture at regular time intervals, wherein when said still picture is recorded at said regular time intervals, said still picture sound related to said still picture is recorded continuously.

10. An image and sound recording/reproducing apparatus according to claim 7, further comprising a selector selecting recording and reproducing to a mode selected from a group including at least a plurality of: a video/animation mode wherein MPEG picture/sound compression is used, a still picture mode wherein JPEG picture compression is used, or a still picture with a sound mode wherein a JPEG picture compression and MPEG sound compression are used.

11. An image and sound recording/reproducing apparatus according to claim 7, further comprising an interface capable of communication with external equipment, wherein said interface is any one of an infrared transmitter/receiver, a cable, a radio transmitter/receiver.

12. An image and sound recording/reproducing apparatus for recording and reproducing a still picture sound with a still picture, comprising:
- a Joint Photograph Experts Group (JPEG) compression/decompression means for compressing and decompressing a still picture image to produce compressed image data and decompressed image data, respectively;
- a Moving Picture Experts Group (MPEG) compression/decompression means for compressing and decompressing a still picture sound related to said still picture image to produce compressed sound data and decompressed sound data, respectively, wherein said still picture sound is compressed/decompressed only according to an MPEG standard;
- multiplexing means for multiplexing said compressed image data and said compressed sound data;
- recording means for recording output from said multiplexing means;
- demultiplexing means for taking out and separating said compressed image data and said compressed sound data from said recording means, respectively; and
- control means for controlling said JPEG compression/decompression means, said MPEG compression/decompression means, said multiplexing means, said recording means, and said demultiplexing means,
- wherein a recording area of said recording means is subdivided into a separate JPEG file area containing JPEG files of said still picture images, a separate MPEG file area containing MPEG files of said still picture sound, and a separate control information area containing control information relating ones of said JPEG files and said MPEG files.

13. An image and sound recording/reproducing apparatus for recording and reproducing a still picture sound with a still picture, comprising:
- a Joint Photograph Experts Group (JPEG) compression/decompression circuit compressing and decompressing a still picture image to produce compressed image data and decompressed image data, respectively;
- a Moving Picture Experts Group (MPEG) compression/decompression circuit compressing and decompressing a still picture sound related to said still picture image to produce compressed sound data and decompressed sound data, respectively, wherein said still picture sound is compressed/decompressed only according to an MPEG standard;
- a multiplexer multiplexing said compressed image data and said compressed sound data;
- a recorder recording output from said multiplexer;
- a demultiplexer taking out and separating said compressed image data and said compressed sound data from said recorder, respectively; and
- a controller controlling said JPEG compression/decompression circuit, said MPEG compression/decompression circuit, said multiplexer, said recorder, and said demultiplexer,
- wherein a recording area of said recorder is subdivided into a separate JPEG file area containing JPEG files of said still picture images, a separate MPEG file area containing MPEG files of said still picture sound, and a separate control information area containing control information relating ones of said JPEG files and said MPEG files.

14. An image and sound recording/reproducing apparatus for recording and reproducing a still picture sound with a still picture, comprising:
- a Joint Photograph Experts Group (JPEG) compression/decompression means for compressing and decompressing a still picture image to produce compressed image data and decompressed image data, respectively;
- a Moving Picture Experts Group (MPEG) compression/decompression means for compressing and decompressing a still picture sound related to said still picture image to produce compressed sound data and decompressed sound data, respectively, wherein said still picture sound is compressed/decompressed only according to an MPEG standard;
- multiplexing means for multiplexing said compressed image data and said compressed sound data;
- recording means for recording output from said multiplexing means;
- demultiplexing means for taking out and separating said compressed image data and said compressed sound data from said recording means, respectively; and
- control means for controlling said JPEG compression/decompression means, said MPEG compression/decompression means, said multiplexing means, said recording means, and said demultiplexing means,
- wherein a recording area of said recording means contains an intermingling of JPEG files of said still picture images, MPEG files of said still picture sound, and control information relating ones of said JPEG files and said MPEG files.

15. An image and sound recording/reproducing apparatus for recording and reproducing a still picture sound with a still picture, comprising:
- a Joint Photograph Experts Group (JPEG) compression/decompression circuit compressing and decompressing a still picture image to produce compressed image data and decompressed image data, respectively;
- a Moving Picture Experts Group (MPEG) compression/decompression circuit compressing and decompressing a still picture sound related to said still picture image to produce compressed sound data and decompressed sound data, respectively, wherein said still picture sound is compressed/decompressed only according to an MPEG standard;
- a multiplexer multiplexing said compressed image data and said compressed sound data;
- a recorder recording output from said multiplexer;
- a demultiplexer taking out and separating said compressed image data and said compressed sound data from said recorder, respectively; and
- a controller controlling said JPEG compression/decompression circuit, said MPEG compression/decompression circuit, said multiplexer, said recorder, and said demultiplexer,
- wherein a recording area of said recorder contains an intermingling of JPEG files of said still picture images, MPEG files of said still picture sound, and control information relating ones of said JPEG files and said MPEG files.

16. An image and sound recording/reproducing apparatus for recording and reproducing a still picture sound with a still picture, comprising:

a Joint Photograph Experts Group (JPEG) compression/ decompression means for compressing and decompressing a still picture image to produce compressed image data and decompressed image data, respectively;

a Moving Picture Experts Group (MPEG) compression/ decompression means for compressing and decompressing a still picture sound related to said still picture image to produce compressed sound data and decompressed sound data, respectively, wherein said still picture sound is compressed/decompressed only according to an MPEG standard;

multiplexing means for multiplexing said compressed image data and said compressed sound data;

recording means for recording output from said multiplexing means;

demultiplexing means for taking out and separating said compressed image data and said compressed sound data from said recording means, respectively; and control means for controlling said JPEG compression/ decompression means, said MPEG compression/ decompression means, said multiplexing means, said recording means, and said demultiplexing means, wherein a file stored in said recording means comprises said compressed image data and said compressed sound data mutually relating to a still picture, and wherein portions of said file has a still picture discrimination header to designate data pertaining to said compressed image data and other portions of said file has a still picture sound discrimination header to designate data pertaining to said compressed sound data, and wherein said demultiplexing means uses said still picture discrimination header and said still picture sound discrimination header when a still picture is reproduced with still picture sound.

17. An image and sound recording/reproducing apparatus according to claim 16, further comprising means for generating a shutter trigger for controlling a timing of recording still pictures.

18. An image and sound recording/reproducing apparatus according to claim 16, further comprising means for generating a control signal for recording a still picture at regular time intervals.

19. An image and sound recording/reproducing apparatus according to claim 16, further comprising selecting means for selecting recording and reproducing to a mode selected from a group including at least a plurality of: a video/ animation mode, a still picture mode, a still picture series mode and a still picture with a sound mode.

20. An image and sound recording/reproducing apparatus according to claim 19, wherein when said selecting means selects said video/animation mode, video/animation data being compressed and decompressed by MPEG compression and decompression means.

21. An image and sound recording/reproducing apparatus according to claim 16, further comprising communication means capable of communication with external equipment, wherein said communication means is at least one of an infrared transmitter/receiver, a cable and a radio transmitter/ receiver.

22. An image and sound recording/reproducing apparatus for recording and reproducing a still picture sound with a still picture, comprising:

a Joint Photograph Experts Group (JPEG) compression/ decompression circuit compressing and decompressing a still picture image to produce compressed image data and decompressed image data, respectively;

a Moving Picture Experts Group (MPEG) compression/ decompression circuit compressing and decompressing a still picture sound related to said still picture image to produce compressed sound data and decompressed sound data, respectively, wherein said still picture sound is compressed/decompressed only according to an MPEG standard;

a multiplexer multiplexing said compressed image data and said compressed sound data;

a recorder recording output from said multiplexer;

a demultiplexer taking out and separating said compressed image data and said compressed sound data from said recorder, respectively; and a controller controlling said JPEG compression/ decompression circuit, said MPEG compression/ decompression circuit, said multiplexer, said recorder, and said demultiplexer, wherein a file stored in said recorder comprises said compressed image data and said compressed sound data mutually relating to a still picture, and wherein portions of said file has a still picture discrimination header to designate data pertaining to said compressed image data and other portions of said file has a still picture sound discrimination header to designate data pertaining to said compressed sound data, and wherein said demultiplexer uses said still picture discrimination header and said still picture sound discrimination header when a still picture is reproduced with still picture sound.

23. An image and sound recording/reproducing apparatus according to claim 22, further comprising means for generating a shutter trigger for controlling a timing of recording still pictures at arbitrary time intervals.

24. An image and sound recording/reproducing apparatus according to claim 22, further comprising means for generating a control signal for recording a still picture at regular time intervals, wherein when said still picture is recorded at said regular time intervals, said still picture sound related to said still picture is recorded continuously.

25. An image and sound recording/reproducing apparatus according to claim 22, further comprising means for selecting a recording and reproducing mode selected from a group including at least a plurality of: a video/animation mode wherein MPEG picture/sound compression is used, a still picture mode wherein JPEG picture compression is used, or a still picture with a sound mode wherein a JPEG picture compression and MPEG sound compression are used.

26. An image and sound recording/reproducing apparatus according to claim 22, further comprising means capable of communication with external equipment, wherein said communication means is any one of an infrared transmitter/ receiver, a cable, and a radio transmitter/receiver.

* * * * *